United States Patent [19]

Lankford et al.

[11] Patent Number: 5,430,485
[45] Date of Patent: Jul. 4, 1995

[54] AUDIO/VIDEO SYNCHRONIZATION IN A DIGITAL TRANSMISSION SYSTEM

[75] Inventors: Douglas E. Lankford, Carmel; Michael S. Deiss, Zionsville, both of Ind.

[73] Assignee: Thomson Consumer Electronics, Inc., Indianapolis, Ind.

[21] Appl. No.: 129,974

[22] Filed: Sep. 30, 1993

[51] Int. Cl.⁶ ................. H04N 7/12; H04N 11/02
[52] U.S. Cl. ................. 348/423; 348/515
[58] Field of Search ............... 348/423, 512–520, 348/536, 537, 538, 541, 542; H04N 9/475, 7/12, 11/02, 11/04

[56] References Cited

U.S. PATENT DOCUMENTS

| | | | |
|---|---|---|---|
| 4,313,135 | 1/1982 | Cooper | 348/518 |
| 4,429,332 | 1/1984 | Pargee, Jr. | 348/423 |
| 4,703,355 | 10/1987 | Cooper | 348/512 |
| 4,851,909 | 7/1989 | Noske et al. | 348/512 |
| 5,202,761 | 4/1993 | Cooper | 348/515 |
| 5,231,492 | 7/1993 | Dangi | 348/423 |

Primary Examiner—James J. Groody
Assistant Examiner—Michael H. Lee
Attorney, Agent, or Firm—Joseph S. Tripoli; Eric P. Herrmann; Ronald H. Kurdyla

[57] ABSTRACT

A receiver (FIG. 2) for decoding associated compressed video and audio information components transmitted in mutually exclusive "frames" of data with respective time stamps $PTS_{vid}$ and $PTS_{aud}$ respectively, includes a controller (216) which is responsive to the respective received time stamps to provide coarse synchronization by delaying or skipping respective frames of one or the other of the components to approximately time align the two components. Fine synchronization is provided by adjusting the processing or clock frequency (215) of the audio signal processor (212) independent of the video processor (214). The control for the frequency adjustment is related to the difference between audio and video time stamps.

14 Claims, 5 Drawing Sheets

AUDIO/VIDEO SYNCHRONIZATION IN A DIGITAL TRANSMISSION SYSTEM

This invention relates to a method and apparatus for synchronizing the audio and video component signals at an audio/video signal decompression apparatus

BACKGROUND OF THE INVENTION

Audio and video (A/V) transmission and reception requires that the audio and video components be properly synchronized. EIA standards RS-250-B limit the time differential between associated audio and video signals to 25 ms. lead or 40 ms. lag time. Film standards limit the time differential of associated audio and video to $\pm \frac{1}{2}$ frame, which corresponds to 20.8 ms. An acceptable goal for source to viewer A/V synchronization is therefore a time differential of $\pm 20$ ms.

Digital communication systems typically time-multiplex associated signal components over a single channel. Such multiplexing is common among A/V transmission systems proposed and implemented for cable, fiber, terrestrial and satellite applications. The time multiplexing of the signal components may destroy their natural time relationships between the transmission and display of the information. Therefore, time critical components of the transmitted component signals may be associated with a time reference before being multiplexed. This is referred to as "stamping" the information, and timing samples are referred to as time stamps. The receiver may then output the respective components in time relative to their respective time stamps. However to accomplish this the receiver must maintain a very precise local time reference, which is synchronous to the encoder time reference.

One reason that the receiver must be tightly coupled to the time base of the transmitter is to insure that the output of real time data matches that of the input to the receiver. If the receiver provides (displays) the data too rapidly, buffers in the receiver may underflow resulting in an interruption of the output signal. If the receiver outputs the data too slowly, the buffers may overflow (assuming finite rate buffers) resulting is a loss of data.

In one proposed system the receiver is synchronized to the transmitter by supplemental time stamps (system clock references, SCR) associated with predetermined packets of transmitted information. The timing of the capture of the time stamps, SCR, bear no relation to presentation time stamps (PTS) which are related to the video data, other than by virtue of being derived from the same counter. The SCR codes are generated by sampling a modulo $2^N$ counter ($N \geq 32$) which counts a substantially constant frequency crystal clock at the transmitter. The receiver incorporates a phase locked loop which has a free running frequency substantially equal to the frequency of the clock in the transmitter. The receiver clock (local clock) is also counted modulo $2^N$, and each time a SCR arrives at the receiver the local counter is sampled to provide a local clock reference or LCR. No attempt is made to force the LCR to equal the SCR. Rather the local clock is adjusted based upon processing changes in the difference between the LCR and SCR time stamps. An error signal is generated according to the relation $$\text{ERR} = |SCR_n - SCR_{n-1}| - |LCR_n - LCR_{n-1}|$$

The signal ERR is utilized to control the local clock frequency. Via this process the LCR can be made arbitrarily close to the transmitter clock frequency. Note that since both the system and local clocks are counting modulo N, they periodically wrap around. On these occurrences the respective terms $SCR_n - SCR_{n-1}$ and $LCR_n - LCR_{n-1}$ will be negative and erroneous. The system monitors the polarity of the respective differences and when one of the differences is negative the difference is ignored.

Video signal coded according to the MPEG standard includes presentation time stamps, $PTS_{vid}$, which are synchronized to the input video frames. The respective $PTS_{vid}$ indicate the relative times that the respective frames are to be displayed at the receiver, nominally 30 Hz, for NTSC source material. Associated audio is also encoded with presentation time stamps $PTS_{aud}$ based on the same time base as the system time and which time stamps are placed in an MPEG system packet layer encompassing the encoded audio data. An audio system packet layer may contain several "frames" of audio data and respective frames equal, in this example, 24 ms. of original audio data. Audio frames are approximately six times the duration of a (127 byte) transport packet. (Information to be transmitted, audio, video, data, etc. are segmented into respective transport packets of predetermined size, with a variety of control words appended, to provide an extra layer of error correction/detection and synchronization.) In addition, according to the MPEG protocol, the number of audio frames per MPEG system layer is a variable Hence there may be little or no correlation between the video $PTS_{vid}$ and audio $PTS_{aud}$ presentation time stamps for associated audio and video source material. Thus synchronizing the audio and video components is difficult if one attempts to do so by comparing the $PTS_{vid}$ with the $PTS_{aud}$. It is an object of the present invention to simplify the process of synchronizing associated audio and video components.

SUMMARY OF THE INVENTION

A receiver for decoding associated video and audio information components transmitted in mutually exclusive "frames" of data with respective time stamps $PTS_{vid}$ and $PTS_{aud}$ respectively, includes a controller which is responsive to the respective received time stamps to provide coarse synchronization by delaying or skipping respective frames of one or the other of the components to approximately time align the two components. Fine synchronization is provided by adjusting the processing or clock frequency of the audio signal processor independent of the video processor. The control for the frequency adjustment is related to the difference between audio and video time stamps.

DETAILED DESCRIPTION

Figure 1:
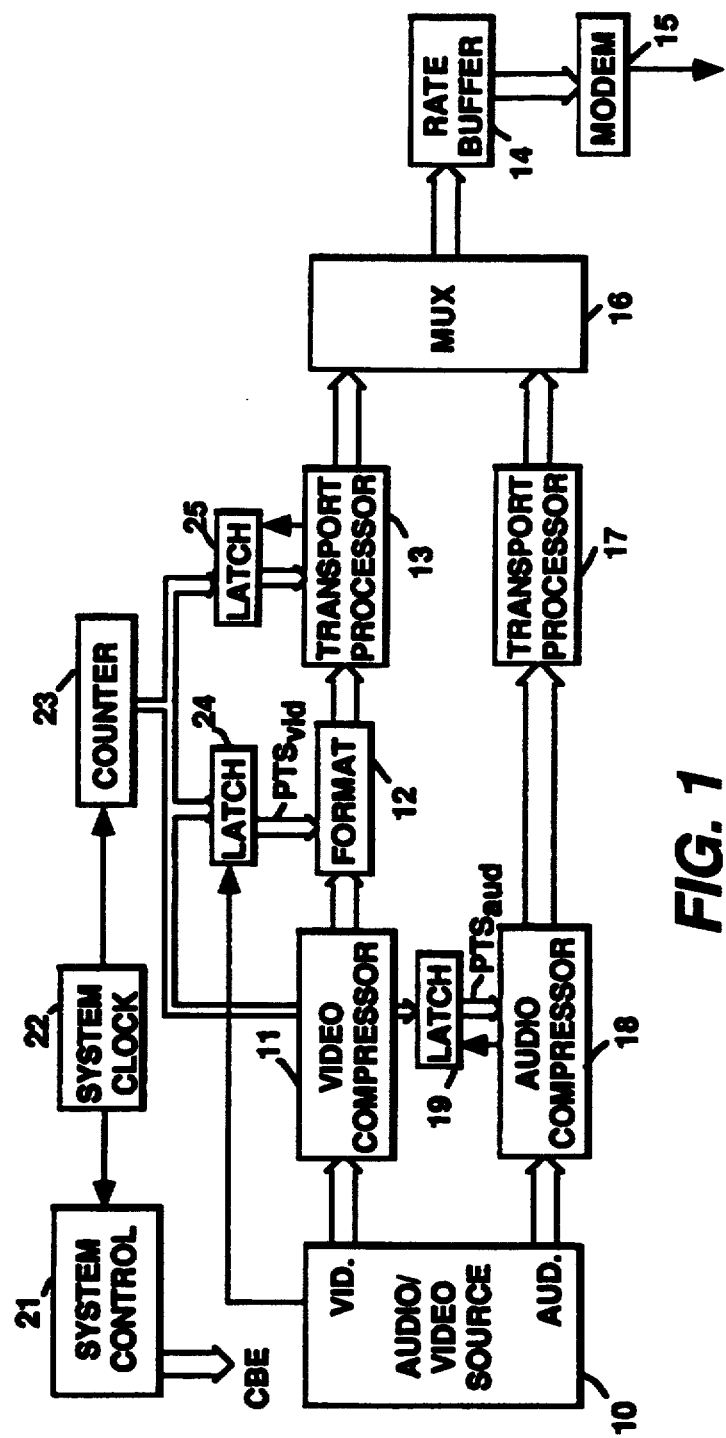
FIG. 1 is a block diagram of audio/video compression apparatus.

FIG. 1 illustrates a typical system in which the invention may be practiced, which system is a compressed digital video signal transmission arrangement. In this system, video signal from a source 10 is applied to a video signal compression element 11 which may include a motion compensated predictive encoder utilizing discrete cosine transforms. Compressed video signal from the element 11 is coupled to a formatter 12. The formatter arranges the compressed video signal and other ancillary data according to some signal protocol such as MPEG, a standard developed by the International Organization for Standardization (Organisation Internationale De Normalisation). The standardized signal is applied to a transport processor 13, which divides the signal into packets of data and adds certain overhead to provide some noise immunity for the transmission purposes. The transport packets, which normally occur at a non-uniform rate are applied to a rate buffer 14 which provides output data at a relatively constant rate conducive to efficient use of a relatively narrow bandwidth transmission channel. The buffered data is coupled to a modem 15 which performs the signal transmission.

A system clock 22 provides clocking signal to operate much of the apparatus, at least including the transport processor. This clock will operate at a fixed frequency such as 27 MHz for example. As shown herein, however, it is used to generate timing information. The system clock is coupled to the clock input of a counter 23 which may be arranged to count modulo $2^{30}$, for example. The count values output by the counter are applied to two latches 24 and 25. The latch 24 is conditioned by the video source to latch count values on the occurrence of respective frame intervals. These count values are denoted presentation time stamps, PTS's, and are included in the compressed video signal stream by the formatter 12, and are used by the receiver to provide lip-synchronization of associated audio and video information. The latch 25 is conditioned by the transport processor 13 (or the system controller 21) to latch count values according to a predetermined schedule. These count values are denoted system clock references, SCR's, and are embedded as auxiliary data within respective auxiliary transport packets.

Audio signal associated with the video signal from source 10 is applied to an audio signal compressor 18. The compressor 18 provides frame sampling pulses (independent of video frames) to control a latch 19. Responsive to the sampling pulses, the latch 19 captures count values provided by the counter 23. These latched values correspond to audio presentation time stamps $PTS_{aud}$. The $PTS_{aud}$ are incorporated in the compressed audio signal provided by the compressor 18. The compressed audio signal is coupled to a transport processor 17 which divides the signal into packets of data and adds certain overhead to provide some noise immunity for transmission purposes. The audio transport packets provided by the processor 17 are coupled to a multiplexor 16 which time division multiplexes the audio and video transport packets. In the figure, separate transport processors are shown in the audio and video signal processing channels. For systems wherein the data rate is moderate, the functions of the two transport processors and the multiplexor 16 may be subsumed in a single transport processor.

The system controller 21 is a variable state machine programmed to coordinate the various processing elements. Note that the controller 21, the compressors 11 and 18, the transport processors 13 and 17, and the rate buffer 14 may or may not operate synchronously via a common clocking arrangement as long as proper handshaking is provided between processing elements. However, the two compressors both derive PTS values from the same reference counter 23, thus a precise timing relationship between the two compressed signals is provided in the compressed output signal.

Figure 2:
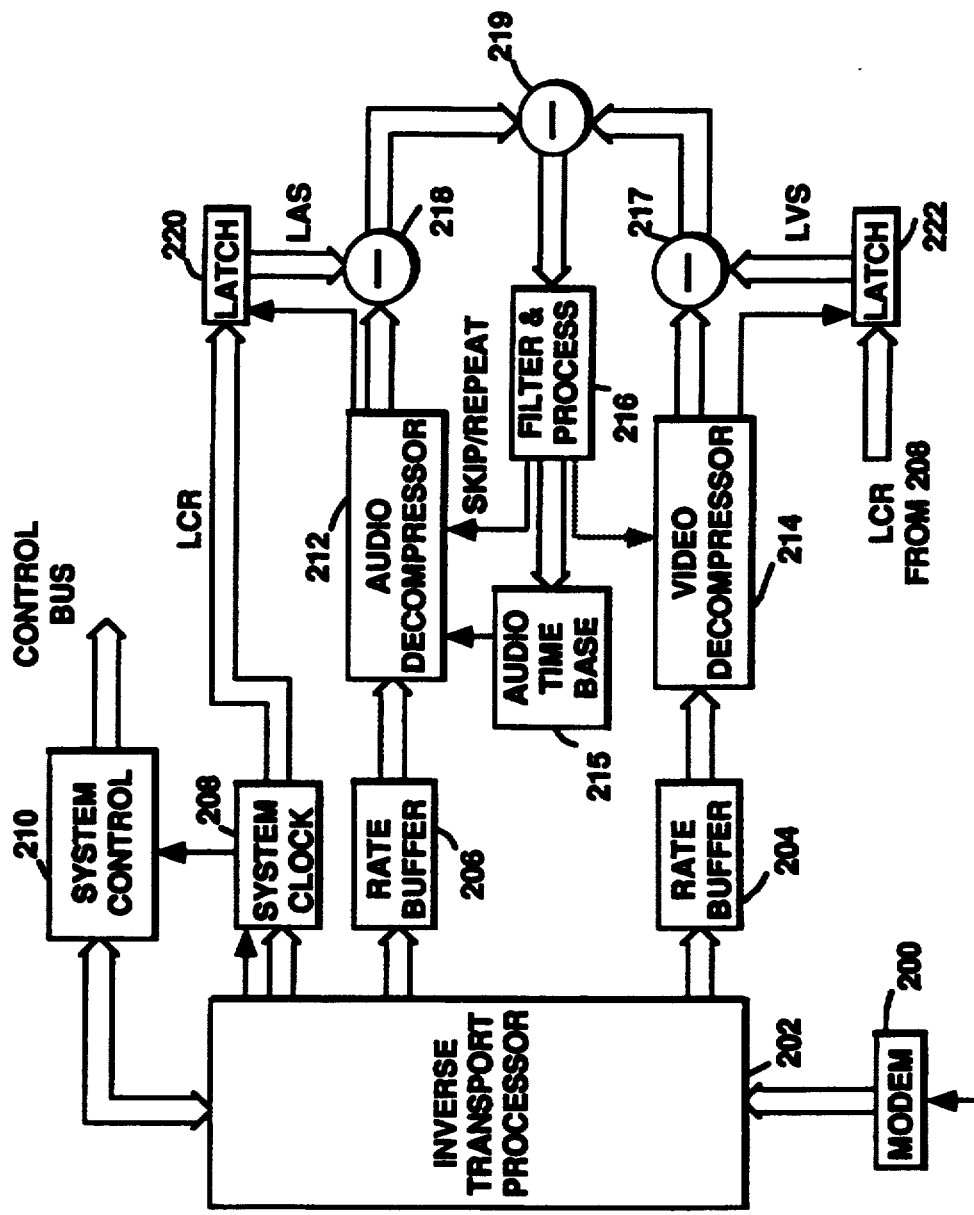
FIG. 2 is a block diagram of a audio/video decompression apparatus embodying the present invention.

FIG. 2 illustrates an exemplary receiver apparatus embodying the invention wherein the modem 200 performs the inverse function of the modem 15 and the rate buffers 204 and 206 perform, in effect, the inverse function of the rate buffer 14. In FIG. 2 a single inverse transport processor 202 is indicated, which processor divides respective transport packets by service and allocates the respective data to the appropriate processing channel. In so doing the respective transport packet signal payloads are separated from the auxiliary data, with the respective payloads being applied to the appropriate processing channel and the auxiliary data applied to the system controller 210. In an alternative arrangement a separate transport processor may be included in each processing channel and arranged to recognize and process only data associated with the respective channels.

Compressed video data from the inverse transport processor 202 is applied to the rate buffer 204, which provides compressed video signal according to the system protocol to the decompressor 214. The rate buffer 204 accepts data at a bursty or inconsistent rate, and provides data on demand to the decompressor 214. The decompressor, responsive to the compressed video signal, generates non-compressed video signal for display or for storage etc., in appropriate display or storage devices (not shown).

Compressed audio data from the inverse transport processor 202 is applied to the rate buffer 206, which provides compressed audio signal according to the system protocol to the audio decompressor 212. The decompressor, 212, responsive to the compressed audio signal generates non-compressed audio signal for reproduction or for storage etc., in appropriate speakers or storage devices (not shown).

The inverse processor 202 also provides SCR's from the auxiliary transport data, and control signals to a system clock generator 208. The clock generator responsive to these signals generates a system clock signal synchronous with at least the transport processor operation. This system clock signal is applied to the receiver system controller 210 to control the timing of appropriate processing elements.

Figure 3:
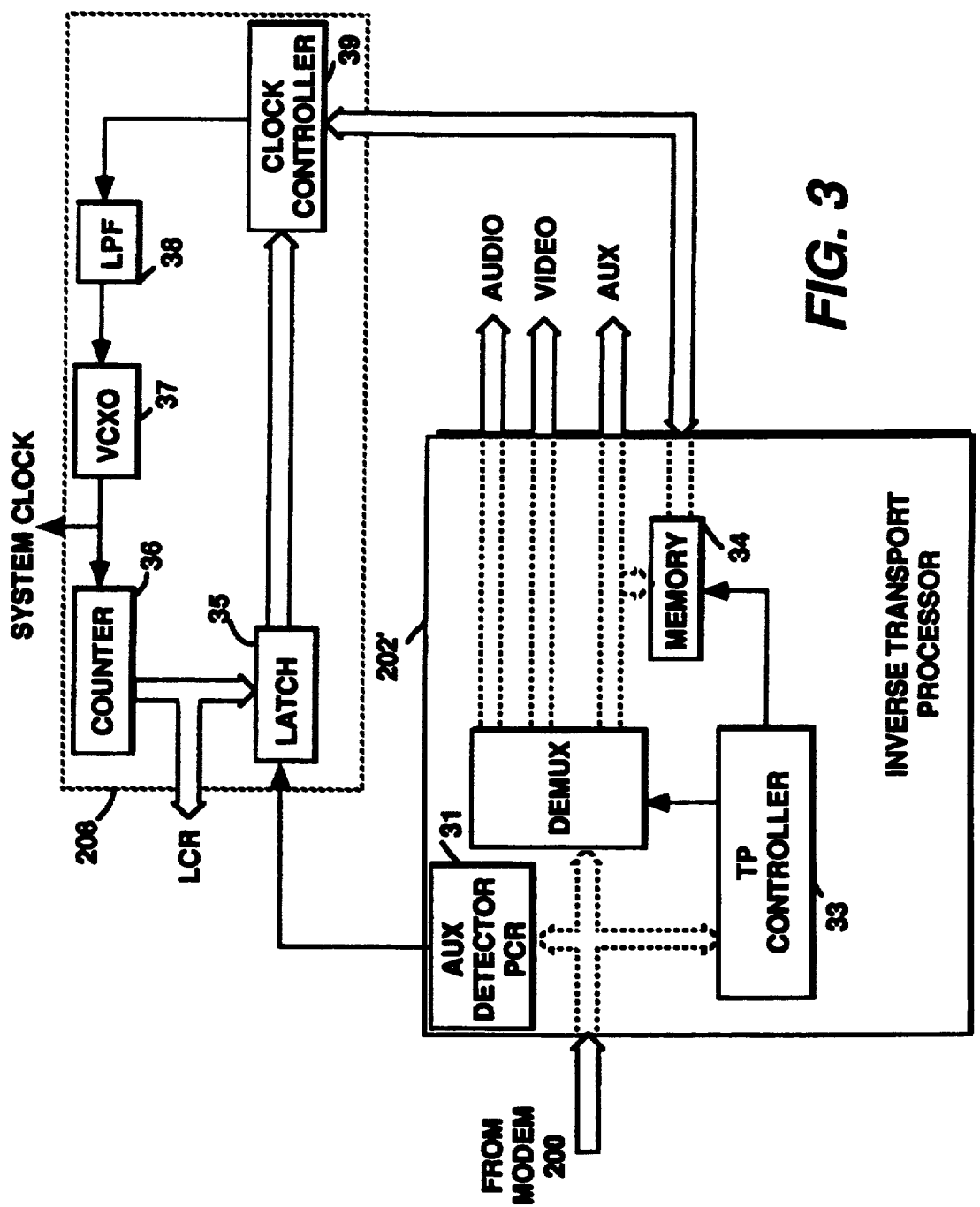
FIG. 3 s a block diagram of apparatus for providing the receiver system clock signal having substantially the same rate as the system clock of the compression apparatus.

FIG. 3 illustrates details of an exemplary clock regenerator 208. Data from the receiver modem 200 is coupled to the inverse transport processor 202', including an auxiliary packet detector 31. The inverse transport processor 202' separates transport header data from the respective transport packet payloads. Responsive to the transport header data, the processor 202' applies audio and video signal payloads to, for example, respective decompression apparatus (not shown), and auxiliary data (designated as AUX) to the appropriate auxiliary data processing elements (not shown). The SCR's residing within the auxiliary data are routed and stored in a memory element, 34.

The auxiliary packet detector 31, which may be a matched filter arranged to recognize the codewords designating an auxiliary transport packet containing a SCR, produces a control pulse on the occurrence of transport packets containing such data. The control pulse is utilized to capture and store within a latch 35, the count value currently exhibited by the local counter 36 at a time precisely related to the time of detection. The local counter 36 is arranged to count pulses provided by a voltage controlled oscillator 37. The counter 36 is arranged to count modulo M which may be, but is not necessarily, the same number as its counterpart counter in the encoder (counter 23). If M differs from N the difference may be accommodated in the error equation.

The voltage controlled oscillator 37 is controlled by a low pass filtered error signal provided by a clock controller 39. The error signal is generated in the following fashion. Let the SCR arriving at time n be designated $SCR_n$ and the local count value concurrently captured in the latch 35 be designated $LCR_n$. The clock controller reads the successive values of SCR's and LCR's and forms an error signal E proportional to the differences $$E \Rightarrow |SCR_n - SCR_{n-1}| - |LCR_n - LCR_{n-1}|$$

The error signal E, is utilized to condition the voltage controlled oscillator 37 to a frequency tending to equalize the differences. As indicated previously, negative differences exhibited due to modulo counter wrap around, may be ignored. The error signal produced by the clock controller 39 may be in the form of a pulse width modulated signal, which may be rendered into an analog error signal by implementing the low pass filter 38 in analog components.

The constraints on this system are that the counters at the two ends of the system count the same frequency or even multiples thereof. This requires that the nominal frequency of the voltage controlled oscillator be fairly close to the frequency of the system clock at the encoder.

The foregoing approach provides rather rapid synchronization but may introduce a long term error. Long term error LTE is proportional to the difference $$LTE \Rightarrow |LCR_n - LCR_0| - |SCR_n - SCR_0|$$

where $SCR_0$ and $LCR_0$ are for example the first occurring SCR and the corresponding latched value of the receiver counter. Nominally the error signals E and LTE will vary in discrete steps. As such, once the system is "synchronized" the error signal will dither one unit about the null point. The preferred method of synchronization is to initiate control of the voltage controlled oscillator using the error signal E until a one unit dither occurs in the error signal E, and then to switch to the use of the long term error signal LTE to control the voltage controlled oscillator.

The system clock signal provided by the VCXO 37 may be utilized to operate at least the transport processor and rate buffers. Since it is synchronized at least in frequency with the encoder system clock, the possibility of rate buffer overflow or underflow due to clock timing errors is substantially non-existent.

Refer again to FIG. 2 for an explanation of audio/video synchronization. Recall that a presentation time stamp $PTS_{vid}$, is included in the compressed video signal associated with predetermined video data. The $PTS_{vid}$ is indicative of the relative time that the associated video is to be displayed. Similarly the compressed audio signal includes presentation time stamps $PTS_{aud}$ associated with audio to be reproduced at times related to the respective $PTS_{aud}$. At the receiver the $PTS_{aud}$ and $PTS_{vid}$ may not be compared directly to provide A/V synchronization because the respective samples were determined at different instants. The respective PTS values are compared to a continuous time base which is the receiver clock provided by the VCXO 37. This is done by sampling local time stamps of the count values LCR.

When data associated with an associated PTS is presented, The LCR is sampled. For example, The audio decompressor 212 issues a $PTS_{aud}$ when a respective audio frame is output for reproduction. At these times a control signal conditions the latch 220 to sample the LCR, the values of which will be designated LAS, for local audio stamp. Similarly when the video decompressor provides a video frame for display, it provides a $PTS_{vid}$ and a control pulse to condition a latch 222 to store the current value of the LCR. These LCR values are designated LVS for local video stamps.

The LAS and the corresponding $PTS_{aud}$ are coupled to respective input terminals of a subtracter 218 which develops the signal $\Delta_{A\text{-}PTS}$ according to the relation;

$$\Delta_{A\text{-}PTS} = PTS_{aud} - LAS$$

The LVS and the corresponding $PTS_{vid}$ are coupled to respective input terminals of the subtracter 217 which develops the signal $\Delta_{V\text{-}PTS}$ according to the relation;

$$\Delta_{V\text{-}PTS} = PTS_{vid} - LVS.$$

The signals $\Delta_{V\text{-}PTS}$ and $\Delta_{A\text{-}PTS}$ are coupled to respective input terminals of a further subtractor, 219, which develops an A/V synchronization error signal $ERR_{PTS}$ according to the relation;

$$ERR_{PTS} = \Delta_{V\text{-}PTS} - \Delta_{A\text{-}PTS}$$

Synchronization of the audio and video requires that the A/V synchronization error be driven to zero. This indicates that when the difference in the values of the corresponding audio and video PTS's equals the time, in units of the local reference, between the occurrence of the corresponding PTS's, the audio and video signal will be in synchronization.

Two mechanisms may be used to adjust the A/V synchronization based upon the error signal $ERR_{PTS}$; skips and repeats of data sections and conversion clock deviation. Skipping fixed intervals or "frames" of audio advances the audio data stream by a fixed interval relative to the video signal. Repeating (or muting without consuming data) delays the audio data stream by fixed intervals relative to the video signal. Skipping and repeating audio frames is audible under many conditions, and therefore is only utilized for coarse adjustment of synchronization. Even so, brief skipping or repeating may be preferable to discernible audio/video synchronization errors. If the audio frames are less than 40 msec, coarse adjustment by skipping/repeating may result in synchronization errors within ±20 msec., which is within industry standards for A/V synchronization. However, this synchronization will degrade if the audio conversion time base does not match that of the source. Once synchronization is coarsely adjusted, variations of the audio conversion clock frequency are arranged to further refine the A/V synchronization.

The error signal ERR$_{PTS}$ is applied to a filter and processing element 216. A filter function therein smoothes the signal ERR$_{PTS}$ to minimize aberrant effects that might otherwise be generated by signal noise. The processing function in the element 216 then examines the smoothed error signal and determines whether a skip/repeat of audio should be utilized to effect coarse synchronization of the audio and video signals and/or whether an adjustment to the audio processing frequency should be utilized to effect fine synchronization. If a coarse synchronization adjustment is determined to be necessary, the processor 216 provides a control signal to the audio decompressor 212 to condition the decompressor to skip or repeat the current decompressed audio frame. Alternatively, or in addition to the coarse adjustment, if a fine adjustment is determined to be necessary, the processor 216 provides a control signal to the audio time base 215 to adjust the frequency of the audio processing clock signal.

Figure 4:
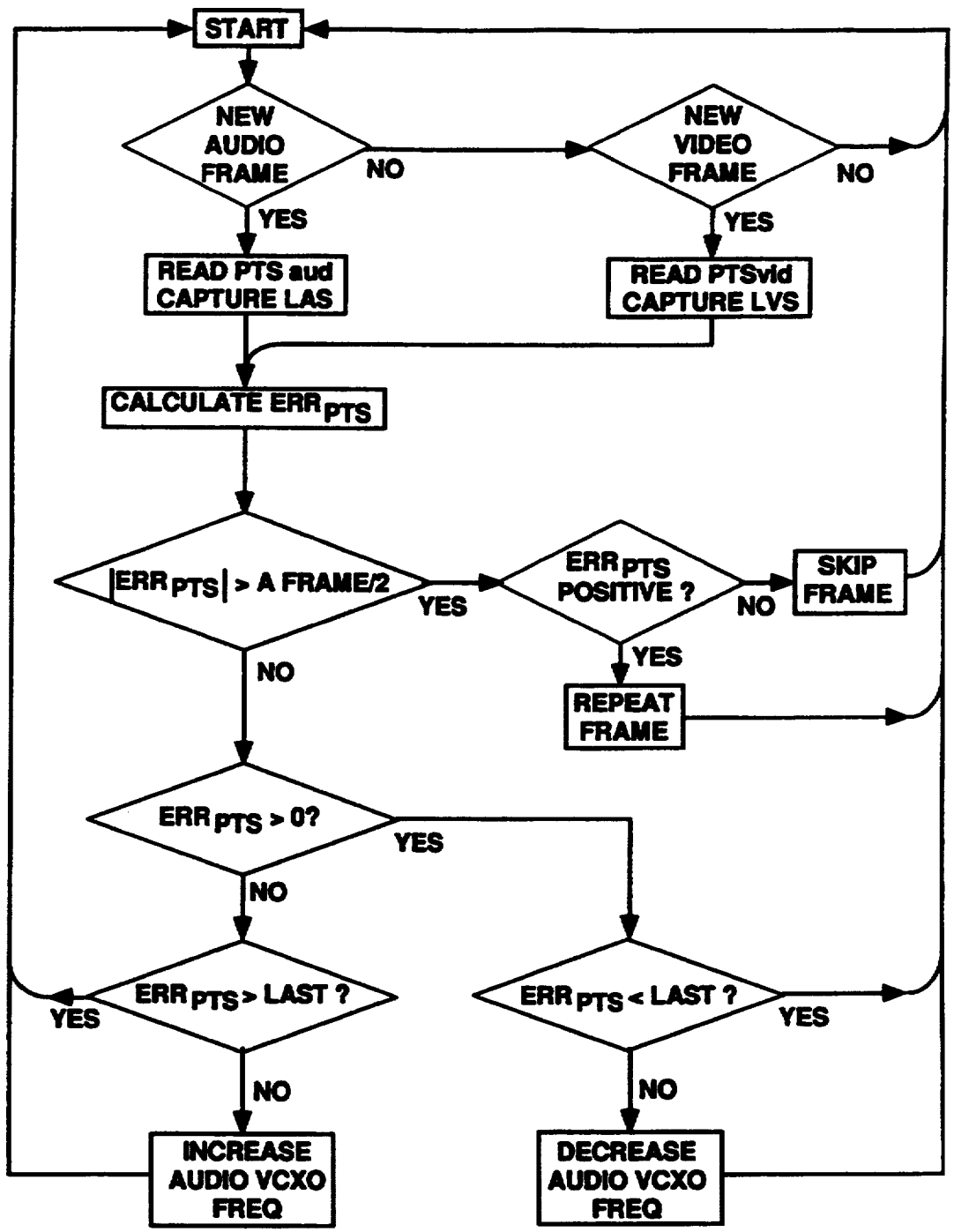
FIG. 4 is a flow chart of the operation of the FIG. 2 apparatus.

The processing algorithm is detailed in the flow chart of FIG. 4. After initialization 400 of the system, which is designated START, the system monitors 401 the audio decompressor for the occurrence of a PTS$_{aud}$ and if a PTS$_{aud}$ is detected it is read 403 and a local clock reference LAS is captured and stored. If a PTS$_{aud}$ has not occurred, the system monitors the video compressor for a PTS$_{vid}$ 402. If a PTS$_{vid}$ has occurred, the PTS$_{vid}$ is read and a local clock reference LVS is captured and stored. When both a PTS$_{aud}$ and a PTS$_{vid}$ have been read the ERR$_{PTS}$ is calculated 405 according to the equation;

ERR$_{PTS}$ = $\Delta_{V\text{-}PTS}$ − $\Delta_{A\text{-}PTS}$.

The magnitude of the error signal is examined 406 to determine if it is greater than one half an audio frame interval. If it is greater than one half an audio frame interval, the error signal is checked for polarity 407. If the polarity is positive, the current audio frame is repeated 409. If it is negative the current audio frame is skipped 408. After skipping or repeating a frame the system iterates back to the start position to wait for the next occurrence of PTS's.

At step 406, if the magnitude of the error signal is less than one half an audio frame interval, the error is examined to determine if it is greater than zero 410. If the error is greater than zero, the error is checked 412 to determine if it is less than the previous error signal. If it is less than the previous error signal, this is an indication that the system is converging toward synchronization, and the synchronization control parameters are not changed. The system returns to the start position to wait for the next PTS's. Conversely, if the error has increased over the previous error signal, the audio system processing clock is adjusted to lessen its frequency 414.

At step 410, if the error is less than zero (negative), it is checked 411 to determine whether it is greater than the previous error signal. If it is greater than the previous error signal, this is also an indication that the system is converging toward synchronization, and the synchronization control parameters are not changed. Alternatively if the current error signal is less than the previous error signal the system is moving further out of synchronization and the audio processing clock frequency is increased 413. After processing steps 412 and 413 the system returns to wait for the next occurrence of PTS's. It will be noted in this example, that the system performs only coarse adjustments via skipping or repeating audio frames until the A/V synchronization error is reduced to less than one half an audio frame interval.

In an alternative embodiment, the filtered error signal is compared against a predetermined threshold related to the size of respective audio frames. If the error signal is less than the threshold, indicative that the audio-video timing error is less than an audio frame, the error signal is coupled to the audio time base circuit 215, wherein it is utilized to adjust the frequency of the audio signal processing (decompression) clock. Alternatively, if the error signal is greater than the threshold, the error signal may be divided by the audio frame interval to determine the number of audio frames that the audio and video signal are misaligned. The integer portion of the quotient is applied to the audio decompressor to condition the audio decompressor to skip or repeat that number of audio frames. The polarity of the error signal will determine whether audio frames should be skipped or repeated. Nominally the decompressed data is arranged in a buffer memory prior to being output, hence skipping or repeating audio frames is a simple matter of controllably enabling the memory read/write commands.

The fractional portion of the quotient is coupled to the audio time base circuit 215, where it is utilized to adjust the audio processing clock to fine tune the A/V synchronization.

The rate of production of audio PTS's is proportional to the processing speed of the audio decompressor. The processing speed of the audio decompressor is directly proportional to the frequency of the clock signal used to operate the audio decompressor. If the clock frequency of the audio decompressor is independent of the clock used to operate the video decompressor, and is finely adjustable then the relative rate of occurrence of the audio and video PTS's can be adjusted and the A/V finely synchronized.

Figure 5:
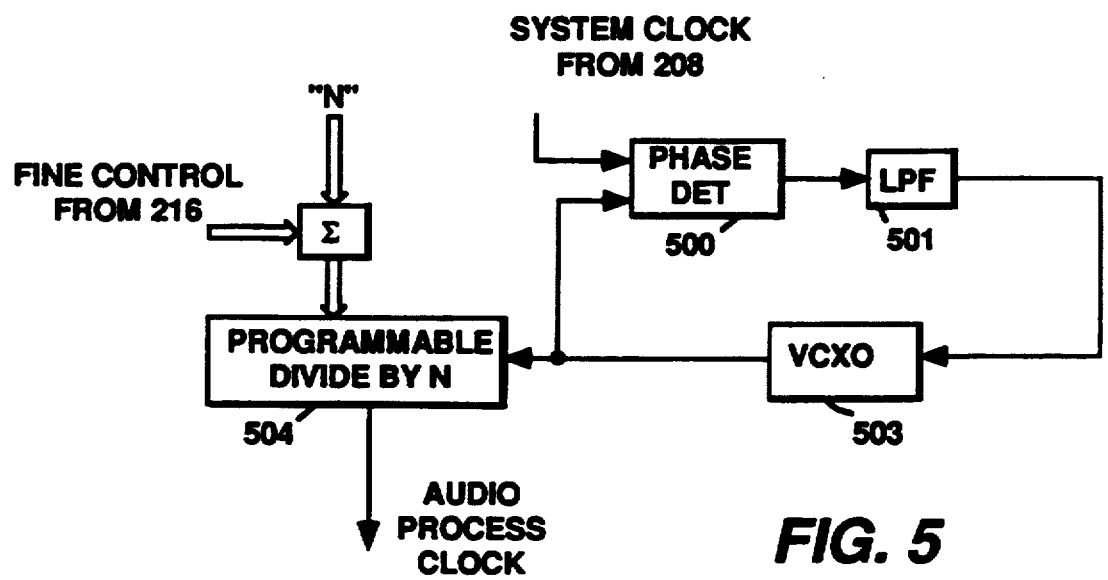
FIGS. 5 and 6 are block diagrams of alternative audio processing clock signal generation which may be implemented for element 215 in FIG. 2.

FIG. 5 is a first embodiment of circuitry for generating an adjustable audio processing clock signal. In FIG. 5 a voltage controlled oscillator, 503, is connected in a phase locked loop including elements 500 and 501. The output of the oscillator is coupled to one input of a phase detector 500. The system clock is coupled to a second input of the phase detector 500 via a binary rate multiplier 505. A phase error signal developed by the phase detector is low pass filtered in filter 501. This smoothed phase error signal is coupled to the control input terminal of the oscillator to condition the oscillator to oscillate at the same frequency and phase as the output of the binary rate multiplier. In this example the system clock frequency is approximately 27 MHz and the desired audio processing clock frequency is approximately 1/380 of the 27 MHz signal. A control signal from the process element 216 is coupled to a control input port of the binary rate multiplier to control its output frequency. This control signal is selected to represent a nominal division ratio of 1/380, but modulates about this value so as to condition the output of the binary rate multiplier to produce an output frequency commensurate with the instantaneous desired audio processing rate.

Figure 6:
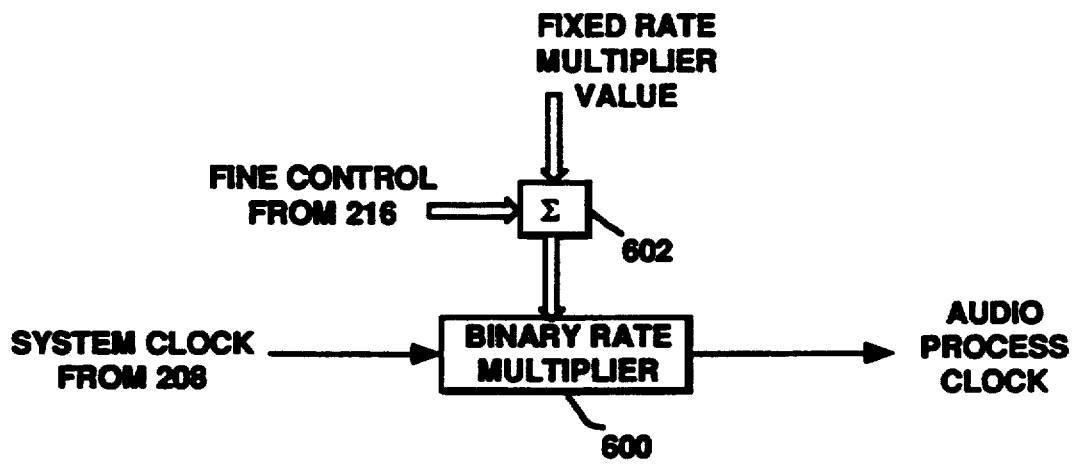

FIG. 6 illustrates a second example of adjustable audio processing clock generation. In this example, a constant clock frequency, from the system clock generator 208 or some other stable oscillator, is applied to one input of a binary rate multiplier 600. The binary rate multiplier is controlled by a control signal from the process element 216 to generate a nominal desired audio processing clock frequency. Responsive to the A/V error signal the process element 216 alters this control signal to condition the binary rate multiplier to either increase or decrease the nominal audio processing clock frequency.

A further alternative audio signal processing rate changing apparatus (not shown) may include an oscillator for providing a nominal maximum audio processing clock frequency and a gating circuit. The oscillator is coupled to the audio processing circuit via the gating circuit. The gating circuit is controlled by the process element 216 to excise ones of the oscillator output pulses to provide, on average, a desired audio processing clock frequency.

An alternative embodiment of the synchronizing apparatus, indicated by the dashed arrow in FIG. 2, may be arranged to skip or repeat video frames to effect synchronization. Alternatively video frames may be skipped for the audio leading (lagging) video and audio frames may be skipped for the audio frames lagging (leading) video. However, in the preferred embodiment, the audio frames are skipped/repeated for audio lagging and leading video respectively.

What is claimed is:

1. Apparatus for providing synchronized, reproduced audio and video signals from recovered compressed audio and video signal, which audio and video signals include respective time stamps $PTS_{aud}$ and $PTS_{vid}$ determined at predetermined intervals and related to an encoder system clock, said apparatus comprising:

a source (200) of said recovered compressed audio and video signals, and a source (208, 37) of reference frequency;

a counter (208, 36) responsive to said reference frequency for providing a sequence of values modulo N where N is an integer;

video signal decompression apparatus (214) responsive to said recovered compressed video signal for providing decompressed video signal and said time stamp $PTS_{vid}$;

audio signal decompression apparatus (212) responsive to said recovered compressed audio signal for providing decompressed audio signal and said time stamp $PTS_{aud}$;

means (222, 217) for capturing values (LVS) of said sequence at predetermined times related to reception of video time stamps $PTS_{vid}$ and for generating differences ($\Delta_{V\text{-}PTS}$) between said values LVS and corresponding time stamps $PTS_{vid}$; and (220, 218) for capturing values (LAS) of said sequence at predetermined times related to reception of audio time stamps $PTS_{aud}$ and generating differences ($\Delta_{A\text{-}PTS}$) between said values LAS and corresponding time stamps $PTS_{aud}$; and means (219, 216, 215) responsive to said differences ($\Delta_{V\text{-}PTS}$) and ($\Delta_{A\text{-}PTS}$) for synchronizing the decompressed audio and video signals.

2. The apparatus set forth in claim 1 wherein said means for synchronizing the decompressed audio and video signals includes means (216, 212) for skipping/repeating predetermined intervals of decompressed audio signal responsive to differences between values ($\Delta_{V\text{-}PTS}$) and ($\Delta_{A\text{-}PTS}$) exceeding a predetermined value.

3. The apparatus set forth in claim 1 wherein said means for synchronizing the decompressed audio and video signals includes means for skipping/repeating predetermined intervals of decompressed video signal responsive to differences between values ($\Delta_{V\text{-}PTS}$) and ($\Delta_{A\text{-}PTS}$) exceeding a predetermined value.

4. The apparatus set forth in claim 1 wherein said audio decompression apparatus, responsive to said recovered compressed audio signal, provides decompressed audio signal at a rate determined by a processing clock signal and said means for synchronizing the decompressed audio and video signals further includes means responsive to differences defined by ($\Delta_{V\text{-}PTS}$)−($\Delta_{A\text{-}PTS}$), for variably adjusting the rate of said processing clock signal.

5. Apparatus for providing synchronized, reproduced audio and video signals from recovered compressed audio and video signal, which audio and video signals include respective time stamps $PTS_{aud}$ and $PTS_{vid}$ determined at predetermined intervals and related to an encoder system clock, said apparatus comprising:

a source (200) of said recovered compressed audio and video signals, and a source (208) of a local clock signal;

video signal decompression apparatus (214) responsive to said recovered compressed video signal for providing decompressed video signal and said time stamp $PTS_{vid}$;

audio signal decompression apparatus (212) responsive to said recovered compressed audio signal for providing decompressed audio signal and said time stamp $PTS_{aud}$;

means (217, 218, 219, 220, 222) for determining, in cycles of said local clock signal, times T between reception of corresponding time stamps $PTS_{aud}$ and $PTS_{vid}$;

means (219) for calculating the difference between values of corresponding time stamps $PTS_{aud}$ and $PTS_{vid}$ and comparing such difference with said time T to generate an A/V synchronization error signal; and means (215, 216) responsive to said A/V synchronization error signal for synchronizing the decompressed audio and video signals.

6. The apparatus set forth in claim 5 wherein said means for determining the time T includes a counter for counting cycles of said local clock signal and providing a value representing said time T which is equal to the number of cycles of said clock signal occurring between the occurrences of said corresponding time stamps $PTS_{aud}$ and $PTS_{vid}$.

7. The apparatus set forth in claim 6 wherein said means for determining the time. T comprises:

a counter responsive to said local clock signal for providing a sequence of count values modulo N where N is an integer; and means responsive to an occurrence of said time stamps $PTS_{aud}$ for capturing a first count value and responsive to the occurrence of a corresponding time stamp $PTS_{vid}$ for capturing a second count value;

a subtractor for determining the difference between said first and second count values.

8. The apparatus set forth in claim 5 wherein said recovered compressed audio signal and video signal include system clock references (SCR's), and said apparatus further includes means responsive to said system clock references for generating said local clock signal synchronous with said encoder system clock.

9. The apparatus set forth in claim 5 wherein said video signal decompression apparatus provides decompressed video signals in first predetermined intervals and said audio signal decompression apparatus provides decompressed audio signal in second predetermined intervals, and said means for synchronizing includes apparatus responsive to said A/V synchronization error signal for skipping or repeating ones of said second predetermined intervals of said decompressed audio signals.

10. The apparatus set forth in claim 9 wherein said audio signal decompression apparatus includes a source of a processing clock signal for operating said audio signal decompression apparatus and said means for synchronizing includes further apparatus responsive to said A/V synchronization error signal for varying the frequency of said processing clock signal.

11. The apparatus set forth in claim 10 wherein said apparatus for varying the frequency of said processing clock signal includes a binary rate multiplier.

12. The apparatus set forth in claim 7 wherein said video signal decompression apparatus provides decompressed video signals in first predetermined intervals and said audio signal decompression apparatus provides decompressed audio signal in second predetermined intervals, and said means for synchronizing includes apparatus responsive to said A/V synchronization error signal for skipping or repeating ones of said second predetermined intervals of said decompressed audio signals.

13. The apparatus set forth in claim 12 wherein said audio signal decompression apparatus includes a source of a processing clock signal for operating said audio signal decompression apparatus and said means for synchronizing includes further apparatus responsive to said A/V synchronization error signal for varying the frequency of said processing clock signal.

14. Apparatus for providing synchronized, reproduced audio and video signals from recovered compressed audio and video signal, which recovered audio and video signals include respective time stamps $PTS_{aud}$ and $PTS_{vid}$ determined at predetermined intervals in an encoder and related to a system clock at said encoder, said apparatus comprising audio decompression apparatus for decompressing said compressed audio signal and video decompression apparatus for decompressing compressed video signal and respectively producing from compressed audio and video signals said time stamps $PTS_{aud}$ and $PTS_{vid}$; and means responsive to the reception of said time stamps $PTS_{aud}$ and $PTS_{vid}$ for measuring times between reception of a $PTS_{aud}$ and a next occurring $PTS_{vid}$ and adjusting a rate of decompression of at least one of said audio and video decompression apparatus such that the time between a reception of a $PTS_{aud}$ and the reception of a next occurring $PTS_{vid}$ substantially equals the difference in values of said $PTS_{aud}$ and the next occurring $PTS_{vid}$.

* * * * *